US006890206B2

(12) United States Patent
Distad et al.

(10) Patent No.: US 6,890,206 B2
(45) Date of Patent: May 10, 2005

(54) OPTICAL TRANSCEIVER LATCH

(75) Inventors: Eugene E. Distad, Mantorville, MN (US); David Peter Gaio, Rochester, MN (US); David Motschman, Rochester, MN (US); Scott Michael Branch, Rochester, MN (US); Paul John Sendelbach, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 57 days.

(21) Appl. No.: 10/378,737

(22) Filed: Mar. 4, 2003

(65) Prior Publication Data

US 2003/0171022 A1 Sep. 11, 2003

Related U.S. Application Data

(60) Provisional application No. 60/426,937, filed on Nov. 15, 2002, provisional application No. 60/382,612, filed on May 24, 2002, provisional application No. 60/381,256, filed on May 17, 2002, and provisional application No. 60/361,654, filed on Mar. 5, 2002.

(51) Int. Cl.[7] ............................................... H01R 13/64
(52) U.S. Cl. ...................... 439/372; 439/638; 439/76.1; 439/157; 361/728
(58) Field of Search .................................. 439/372, 638, 439/76.1, 157, 352; 361/728, 732, 740

(56) References Cited

U.S. PATENT DOCUMENTS

| 5,901,263 | A | | 5/1999 | Gaio et al. ..................... 385/92 |
| 6,430,053 | B1 | * | 8/2002 | Peterson et al. ............. 361/728 |
| 6,439,918 | B1 | | 8/2002 | Togami et al. .............. 439/372 |
| 6,533,603 | B1 | * | 3/2003 | Togami ....................... 439/372 |

* cited by examiner

Primary Examiner—Truc T. T. Nguyen
(74) Attorney, Agent, or Firm—Allen, Dyer, Doppelt Milbrath & Gilchrist, P.A.

(57) ABSTRACT

The present invention relates to a latching system for an optical transceiver module that eliminates the use of compound latching mechanisms by providing a single latching lever for unplugging the module from its mounting cage. The latching lever includes a pair of arms with a bail handle on one end to facilitate actuation of the latching lever and manipulation of the module. The other end of the latching lever applies a force to the cage to separate first and second mating latching members on the module and the cage, respectively. The fulcrum of the lever is provided by a bend in each arm, which acts like a journal, mounted in a bearing depression formed in the module housing.

18 Claims, 13 Drawing Sheets

OPTICAL TRANSCEIVER LATCH

CROSS-REFERENCE TO RELATED APPLICATIONS

The present invention claims priority from U.S. patent applications Ser. No. 60/361,654 filed Mar. 5, 2002; Ser. No. 60/381,256 filed May 17, 2002; Ser. No. 60/382,612 filed May 24, 2002 and Ser. No. 60/426,937 filed Nov. 15, 2002.

TECHNICAL FIELD

The present invention relates to a latching device for an optical transceiver, and in particular to a pivoting bail latching device used for latching an optical transceiver within a cage.

BACKGROUND OF THE INVENTION

With the advent of "hot pluggable" optical transceivers, latching devices have become a popular safety feature to ensure that the transceiver module is held within the guide rail or cage until purposely removed. Bail latching devices have become particularly popular, due to their functional and ergonomic advantages. Previous bail designs are disclosed in U.S. Pat. No. 5,901,263 issued to IBM Corp., and U.S. Pat. No. 6,439,918 issued to Finisar Corp. The bail in the IBM device forces plastic arms, which are normally biased inwardly, outwardly into engagement with the guide rail system. The bail in the Finisar device pivots a separate pivoting latch member, which is normally biased into engagement with the cage by a specially designed extension of the housing. Both of these devices require specially designed housings, and the use of a separate pivoting latch member or arm, which moves into or out of engagement with the guide rail or cage system. The Finisar device in particular requires a complex assembly process to ensure that the bail, the pivoting latch member and the housing all interact correctly.

An object of the present invention is to overcome the shortcomings of the prior art by providing a simpler bail latching device with fewer movable parts, providing a more robust structure, and facilitating a much easier assembly process.

SUMMARY OF THE INVENTION

Accordingly, the present invention relates to an opto-electronic device for transmitting signals between an optical waveguide and a host computer of the type including a mounting cage for receiving the opto-electronic device, the opto-electronic device comprising:

an optical sub-assembly for converting optical signals into electrical signals or electrical signals into optical signals;

a housing for supporting the optical sub-assembly, the housing including a first latching member for engaging a corresponding second latching member on the mounting cage;

an optical connector on a first end of said housing for receiving the optical waveguide, and for aligning the optical waveguide with the optical sub-assembly;

a printed circuit board mounted in the housing including circuitry for controlling the optical sub-assembly;

an electrical connector extending from a second end of said housing for transmitting electrical signals between the printed circuit board and the host computer; and a latching lever pivotally mounted on said housing having a grasping section extending from the first end of said housing for manually rotating the latching lever, and a force applying section for applying a force to the mounting cage to disengage the first and second latching members when the latching lever is rotated.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
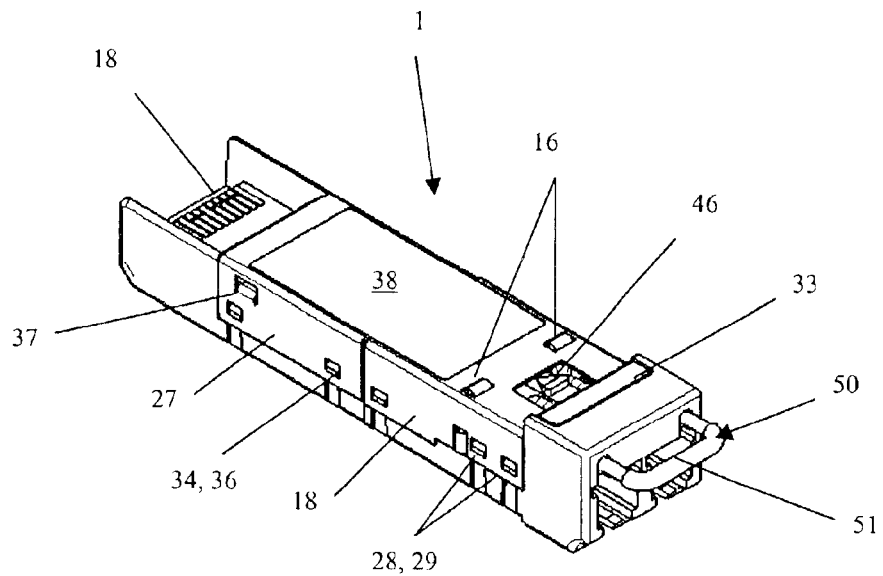
FIG. 1 is an isometric view of the bottom of an optical transceiver device according to the present invention.
Figure 2:
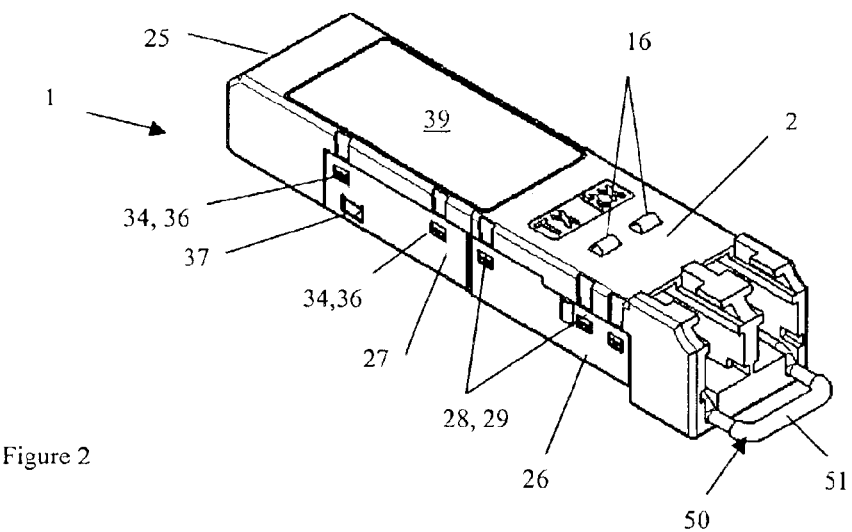
FIG. 2 is an isometric view of the top of an optical transceiver device according to the present invention.
Figure 3:
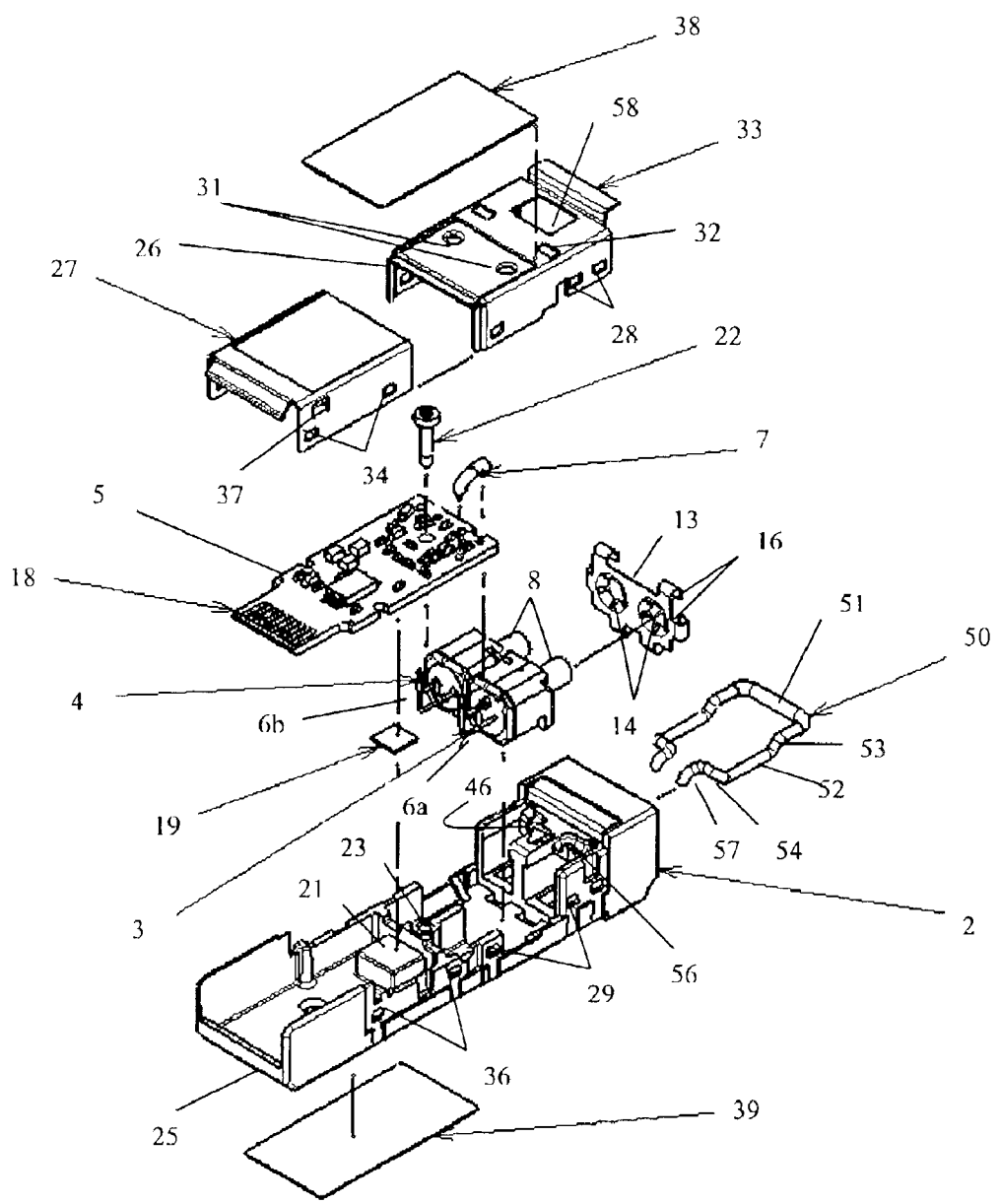
FIG. 3 is an exploded view of the device of FIGS. 1 and 2.
Figure 4:
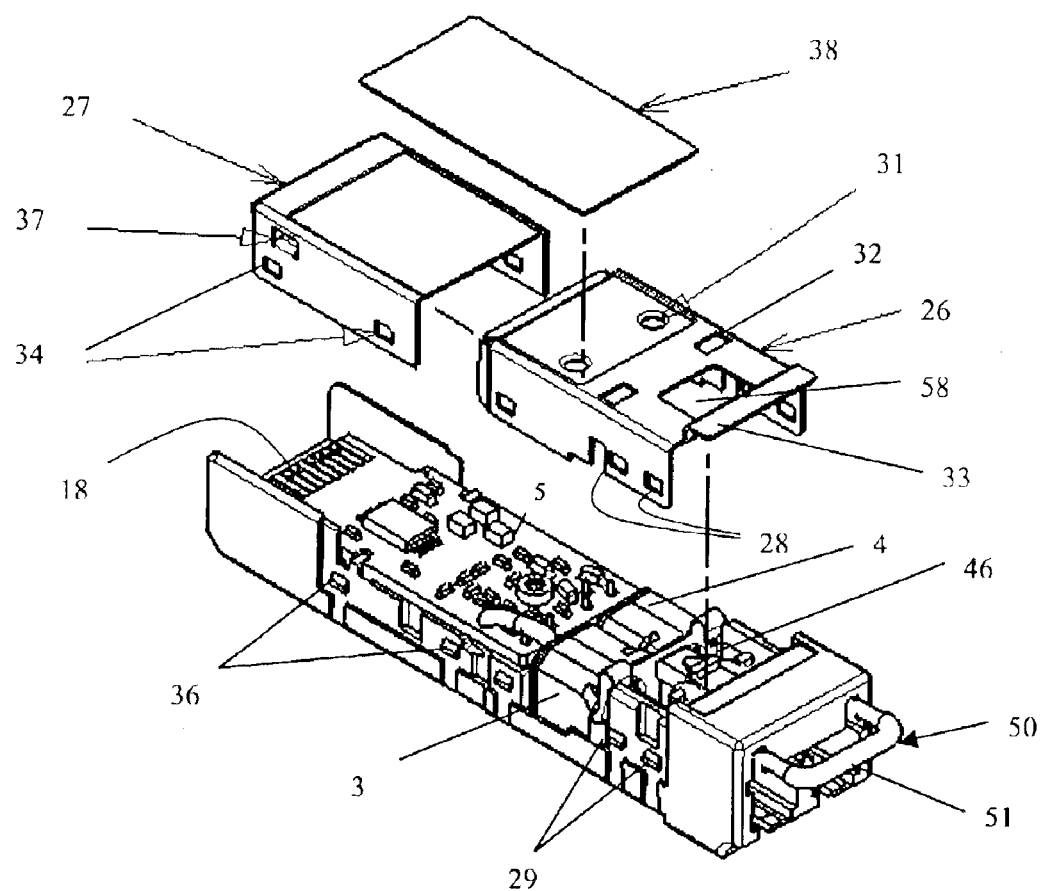
FIG. 4 is a partially exploded view of the device of FIGS. 1 and 2.
Figure 5:
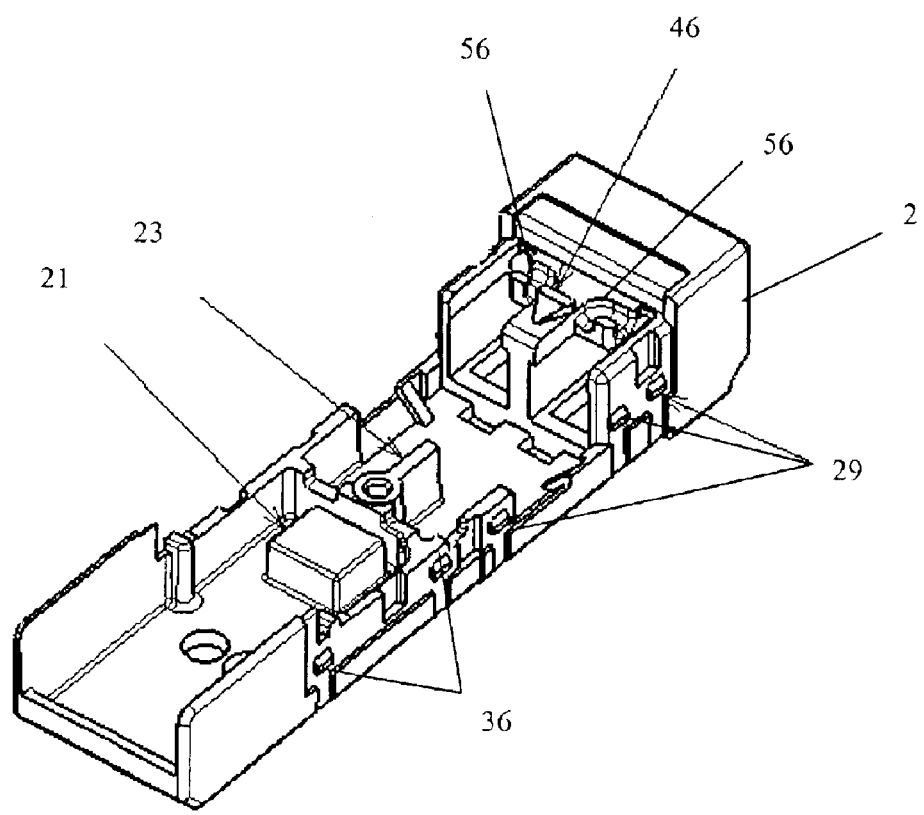
FIG. 5 is a isometric view of the housing of the device of FIGS. 1 and 2.

With reference to FIGS. 1 to 5, an optical transceiver 1 according to the present invention includes a thermally conductive housing base 2, e.g. cast metal, with a receiver optical subassembly (ROSA) 3 and a transmitter optical sub-assembly (TOSA) 4 mounted in the front end thereof, and a printed circuit card 5 extending from the back end thereof.

L-shaped electrical leads 6a and 6b extend from the back end of the ROSA 3 and TOSA 4, respectively, into contact with the printed circuit card 5 for transmitting power and electrical signals therebetween. An extra wire 7 is provided for connecting the ROSA ground to a logic ground on the underside of the printed circuit card 5 A pair of cylindrical optical connectors 8 extend from the front ends of the ROSA 3 and the TOSA 4 for receiving a duplex optical connector 9, e.g. an LC optical connector. The front end of the housing base 2 forms a shroud for receiving the duplex optical connector 9, as is well known in the art. The duplex optical connector 9 couples optical fibers 11 and 12 with the TOSA 4 and the ROSA 3, respectively. An internal electromagnetic interference (EMI) shield 13 includes radially extending spring fingers 14 for frictionally engaging the outer surface of the optical connectors 8, and outwardly extending EMI fingers 16 for engaging a mounting cage 17, which will be discussed in greater detail with reference to FIGS. 6, 7 and 8.

An electrical card-edge connector 18 is provided at the outer free end of the printed circuit card 5 for "hot plugging" the transceiver 1 into an electrical connector (not shown) provided in the cage 17, thereby electrically connecting the transceiver 1 with a host device for the exchange of power and data signals.

A thermal pad 19 is positioned between the printed circuit card 5 and a thermal boss 21, which is cast into the housing base 2. A threaded fastener 22 secures the printed circuit card 5 to a T-shaped projection 23 (FIG. 5), which is also cast into the housing base 2. Heat is dissipated from the printed circuit card 5 through the combination of the thermal pad 19, the thermal boss 21, the threaded fastener 22 and the T-shaped projection 23.

The T-shaped projection 23 also separates and shields the ROSA leads 6a from the TOSA leads 6b, thereby reducing electrical crosstalk between the two components, without the use of separate shields. The crosstalk originates from the radiated fields caused when the laser is driven at high (multi-gigahertz levels) electrical frequencies. The metal in the T-shaped projection 23 shunts the electrical fields from crossing to the other side of the printed circuit card 5. Metal to metal contact is provided by a mating top surface, e.g. made of copper, on the printed circuit card 5.

The housing 2 base is provided with a chamfered or bevelled rear edge 25 to prevent the housing base 2 from short circuiting the circuit board mounted electrical connector (not shown), if the user attempts to incorrectly plug the transceiver 1 into the cage 17 upside down.

The housing base 2 is enclosed by a front sheet metal cover 26 and a rear sheet metal cover 27. The front cover 26 is connected to the housing base 2 using cleats 28, formed in the sides of the front cover 26, which engage projections 29 extending from the side of the housing base 2. Coined-in bumps 31 are provided in the cover 26 for applying a retaining force directly onto the ROSA 3 and the TOSA 4, when the transceiver module 1 is assembled. The openings 32 are necessary to enable the EMI fingers 16 to extend into contact with the cage 17. A Z-shaped bend 33 in the front of the front cover 26 acts like a spring to ensure that the front cover 26 is secure at all times.

The rear cover 27 also includes cleats 34, which engage projections 36 extending from the housing 2. Metal tabs 37 are provided in the rear cover 27 for holding the rear part of the circuit card 5 firmly in place in the housing base 2. The front and rear covers 26 and 27 are independent to enable access to test points on the transceiver 1. Moreover, the two covers 26 and 27 are manufactured with different widths to conform to mechanical standards. A laser safety label 38 is provided covering parts of both the front and rear covers 26 and 27. Similarly, a customer label 39 is provided covering a portion of the lower surface of the housing 2.

Figure 6:
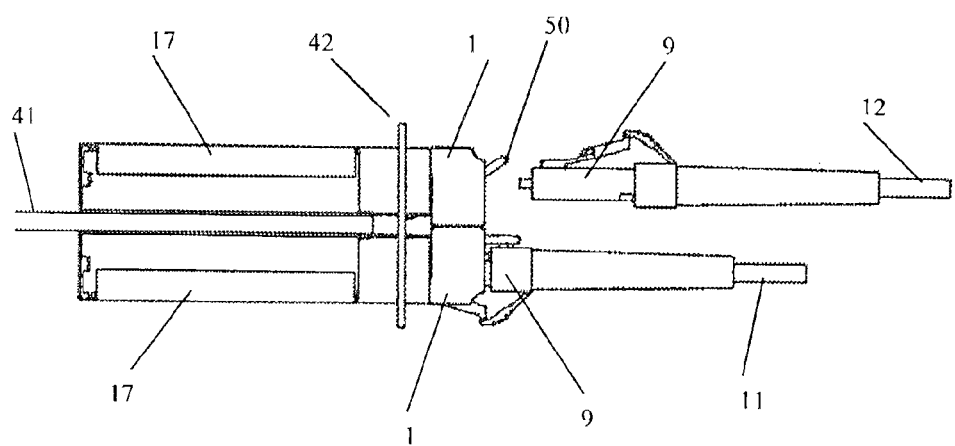
FIG. 6 is a side view of two of the devices of FIGS. 1 and 2 mounted on a host circuit board in a belly to bell arrangement.
Figure 7:
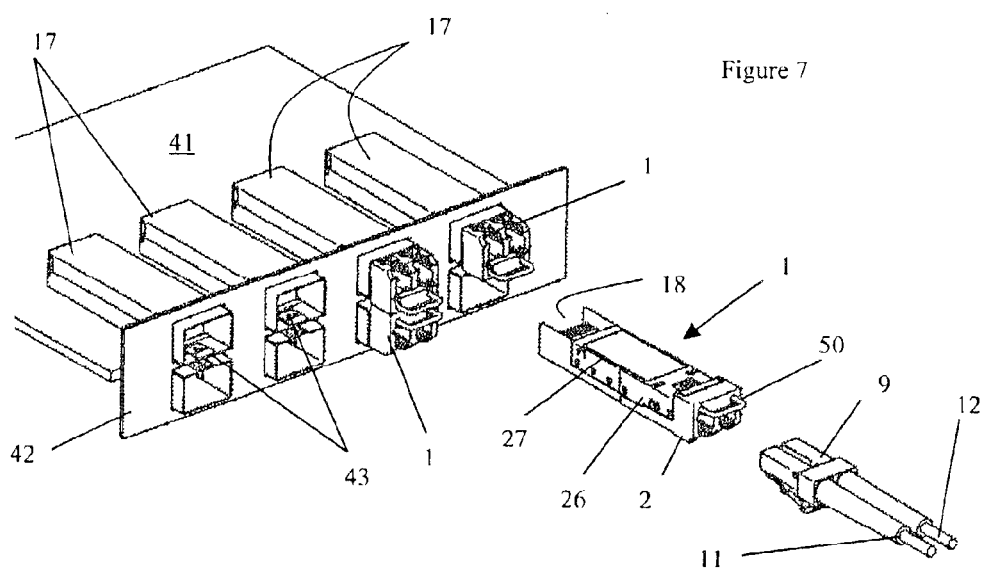
FIG. 7 is an isometric view of several of the devices of FIGS. 1 and 2 mounted on a host circuit board.
Figure 8:
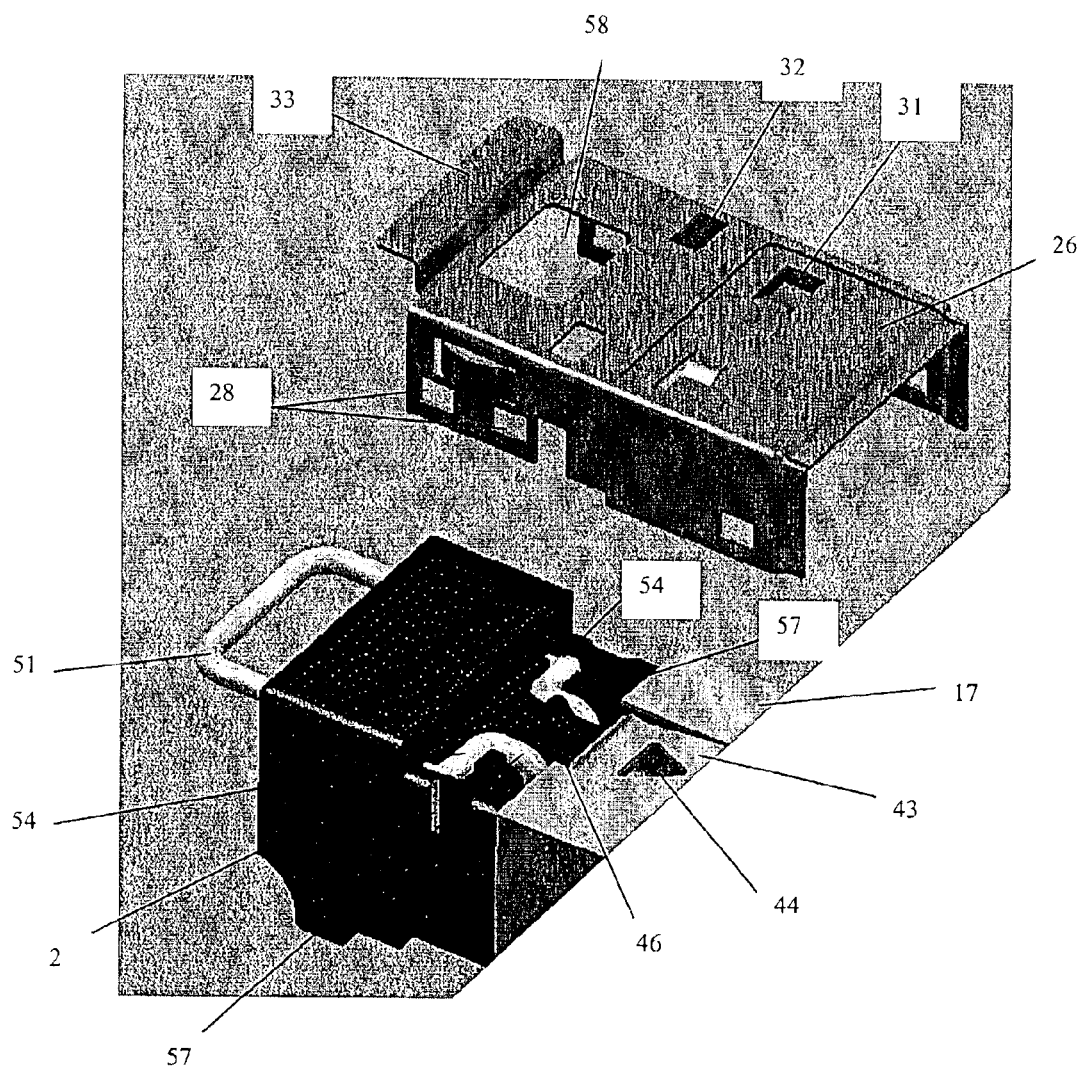
FIG. 8 is a partially exploded view of the front end of the device of FIGS. 1 and 2.

With reference to FIGS. 6, 7 and 8, the optical transceivers 1 are guided by the cages 17 for hot-plugging into electrical connectors (not shown), which are mounted on a printed circuit board 41 of a host device, represented by faceplate 42. Each cage 17 includes a resilient tongue 43 with a triangular recess 44 for receiving a mating latch projection 46 extending from the transceiver housing 2. The latch projection 46 is provided with a sloped front side, which acts as a camming surface to lift the tongue 43, during insertion of the transceiver 1 into the cage 17.

A bail latching lever 50 is provided for disengaging the transceiver 1 from the cage 17. The bail latching lever 50 includes a laterally extending grasping section 51, which enables the user to both pivot the bail latching lever 50 and pull the transceiver 1 from the cage 17. The grasping section 51 can be color coded to differentiate the different optical wavelength transceivers. Two elongated arms 52 extend from the grasping section 51 into the front end of the housing base 2. A small downwardly angled offset 53 is provided in the arms 52 to ensure that the grasping section 51 does not interfere with the coupling of the duplex optical connector 9 with the optical connectors 8. Journal bearing sections 54 extend from the arms 52 inwardly towards each other and get seated in bearing surfaces, e.g. depressions 56 (FIGS. 5 and 8) provided in the housing base 2. Force applying fingers 57 extend from the journal bearing sections 54 on each side of the latch projection 46. The ends of the fingers 57 are bent downwardly in the direction of the housing base 2 providing a solid stop defining one extreme of the bail latching lever's throw travel to prevent the bail latching lever 50 from over rotating, and to ensure the fingers 57 do not have any sharp edges, which could damage the cage 17 during insertion of the transceiver 1. A second stop is provided inside the housing base 2 defining the other extreme of bail latching lever's throw travel. The front cover 26 applies a small amount of force to the journal bearing sections 54 to hold them in the bearing surfaces 56, and to prevent any rattling. Furthermore, the force ensures that the bail latching lever 50 is always electrically grounded to the transceiver housing base 2 and cover 26 to prevent EMI during use. A hole 58 is provided in the front cover 26 to enable the fingers 57 to pivot into contact with the tongue 43 on each side of the recess 44.

Accordingly, during insertion, the bail latching lever 50 remains freely rotatable, and thereby interferes with the connection of the duplex optical connector 9 with the optical connectors 8. Just prior to latching, the bent ends of the fingers 57 act as a camming surface with the outer end of the cage 17, and pivot the bail latching lever 50 into a down position, as in FIG. 8. Subsequently, the latch projection 46 simply deflects the tongue 43 until engaging the triangular recess 44. During removal, the bail latching lever 50 is rotated into an up position by rotating the grasping section 51 in one direction which rotates the fingers 57 in the opposite direction, thereby disengaging the tongue 43 from the latch projection 46 and enabling the transceiver 1 to be pulled out of the cage 17.

With reference to FIG. 6, the top arrangement illustrates how the present invention prevents the connection of the duplex optical connector 9 into the transceiver 1 until the transceiver 1 is fully inserted into the cage 17 and the bail latching lever 50 is in the down position. Furthermore, the aforementioned bail latching arrangement prevents the transceiver 1 from being unplugged from the cage 17, while the duplex optical connector 9 is seated in the transceiver 1, because the duplex optical connector 9 prevents the grasping section 51 from being rotated. Moreover, the transceivers 1 can be plugged in "belly to belly", because the throw travel of the grasping section 51 always remains within the end-face dimensions of the transceiver 1, and therefore will never interfere with the other devices.

Figure 9:
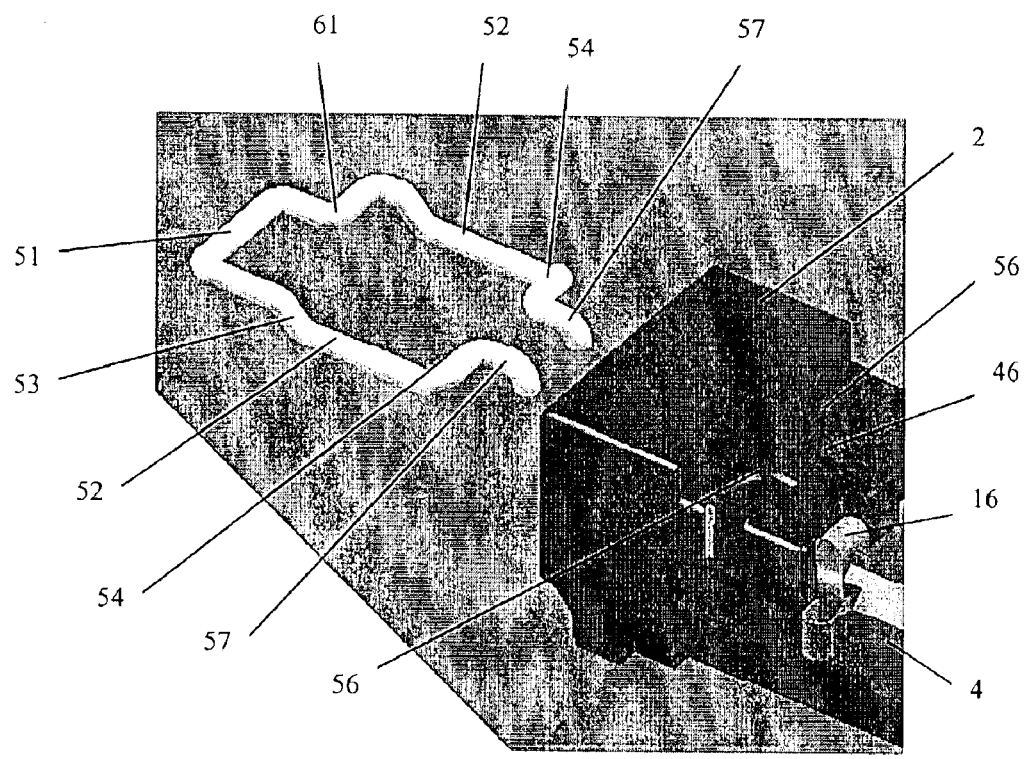
FIG. 9 is a partially exploded view of a front end of another embodiment of the present invention.
Figure 10:
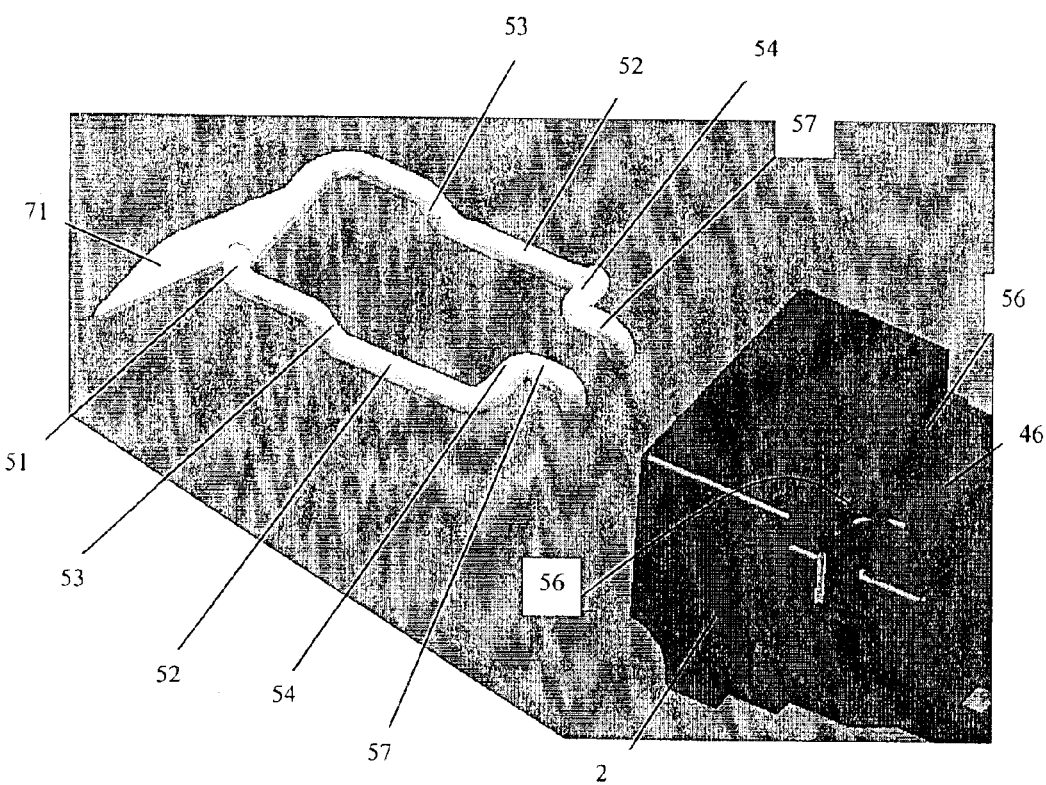
FIG. 10 is a partially exploded view of a front end of another embodiment of the present invention.
Figure 11:
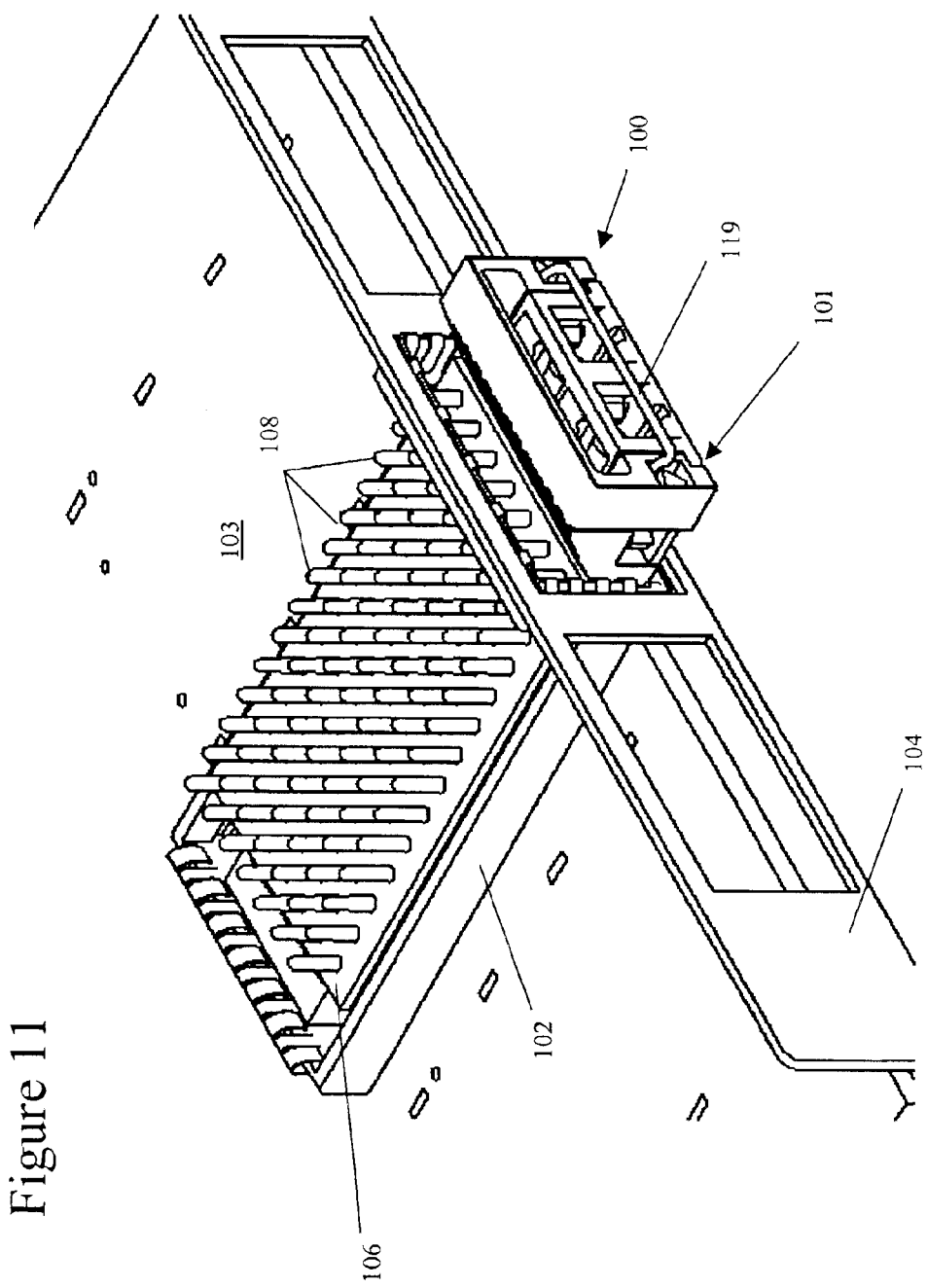
FIG. 11 is an isometric view of another embodiment of a transceiver module of the present invention mounted in a guide rail.
Figure 12:
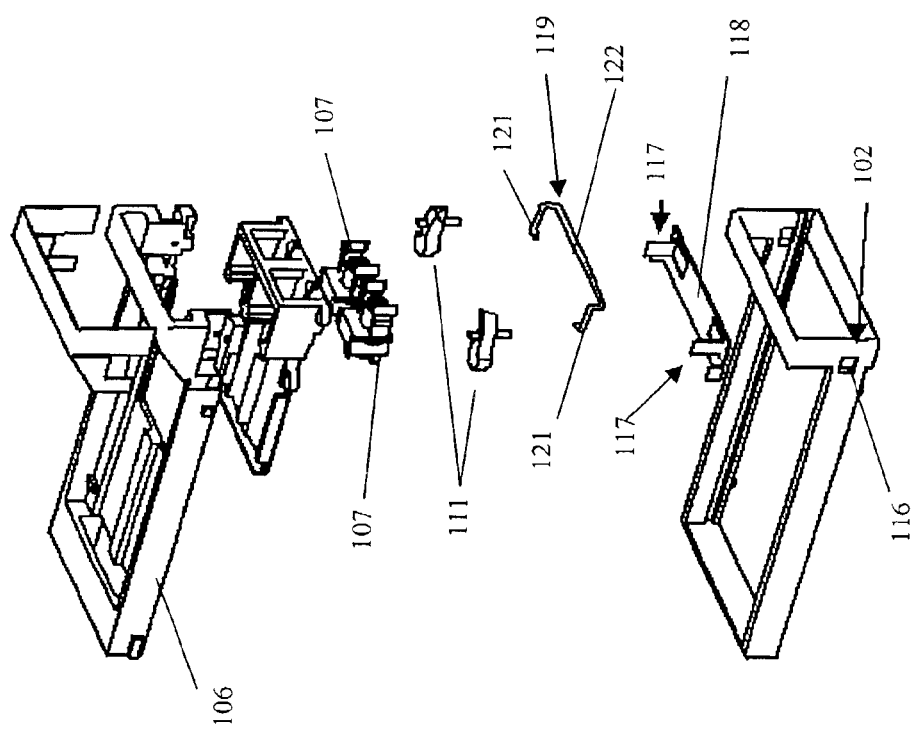
FIG. 12 is an exploded view of the transceiver module of FIG. 11.

Variations of the bail latching lever 50, facilitating access to the grasping section 51, are illustrated in FIGS. 9 and 10.

The bail latching lever 50, illustrated in FIG. 9, includes a lateral offset 61 in one of the arms 52, whereby the grasping section 51 does not extend the full distance between the arms 52. The open area created by the offset 61 enables the user to more easily access the grasping section 51 of another transceiver 1, positioned in the "belly to belly" position illustrated in FIG. 6.

Alternatively, as in FIG. 10, a rectangular pull tab 71 can be attached to the grasping section 51 to provide a greater amount of surface area to grasp. The pull tab 71 can also be color coded to identify various characteristics of the transceiver module.

With reference to FIGS. 11 to 15, another embodiment of the present invention includes a transceiver module 100 having an integrated locking feature in the form of a pair of latch mechanisms, generally indicated at 101. The transceiver module 100 is "hot pluggable" in a guide rail or cage assembly 102, which is mounted on a printed circuit board 103 of a host device represented by chassis 104.

The transceiver module 100 includes a housing 106 for supporting and enclosing opto-electronic components, e.g. a transmitter optical sub-assembly (TOSA) and a receiver optical sub-assembly (ROSA), which are both electrically connected to a printed circuit board (PCB). The PCB includes signal processing electronics with digital and analog circuitry for controlling and monitoring the transmitter and receiver optical sub-assemblies. An electrical connection for the transceiver module 100 to the host printed circuit board 103 is usually made through an edge connector disposed at an extremity of the PCB or via a multi-pin connector disposed at an extremity of the transceiver module 100. The optical connection of light signals to the transceiver module 100 is made through optical fiber connectors disposed at an end of optical fibers and inserted into optical connector receptacles 107 disposed at an end of the transceiver module 100. The housing 106 includes heat-dissipating projections 108 for dissipating heat generated by the electronics and optics of the of the transceiver module 100.

Figure 13:
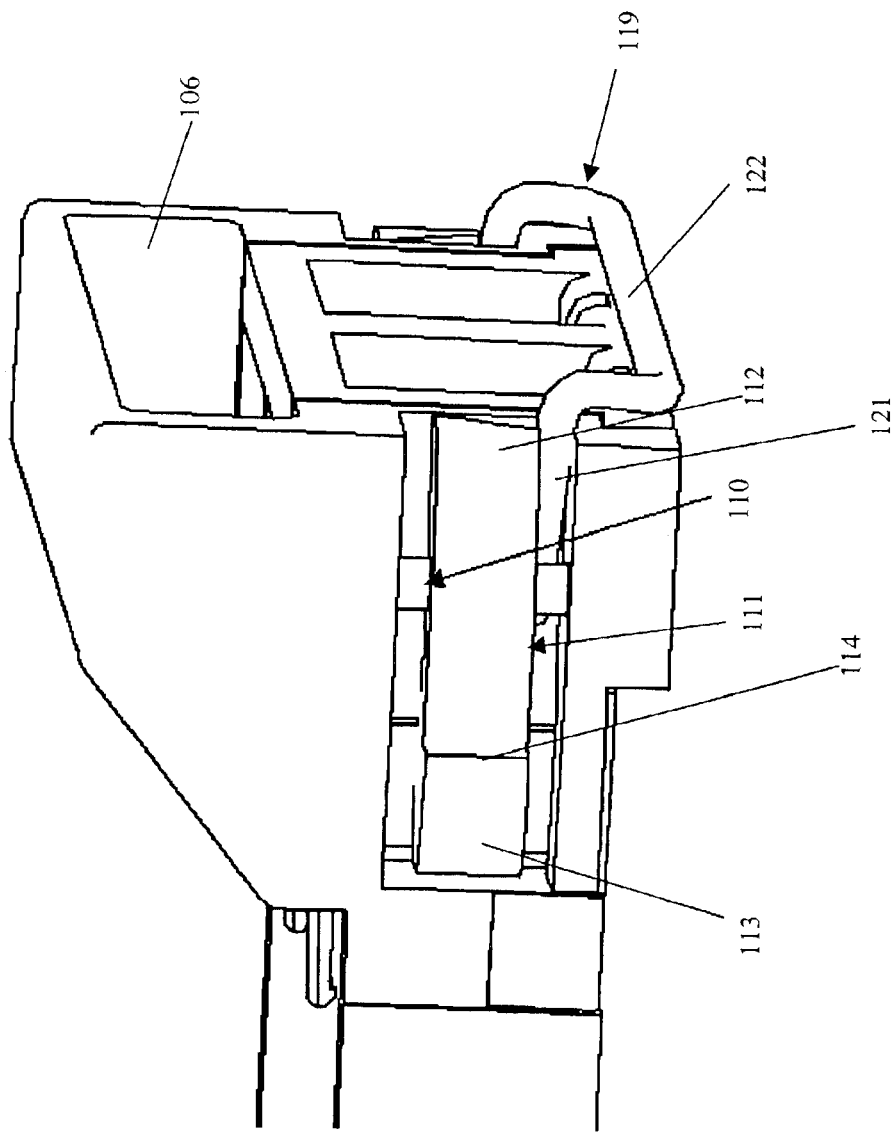
FIG. 13 is an isometric view of the pivoting latch mechanism of the transceiver module of FIGS. 11 and 12.
Figure 14:
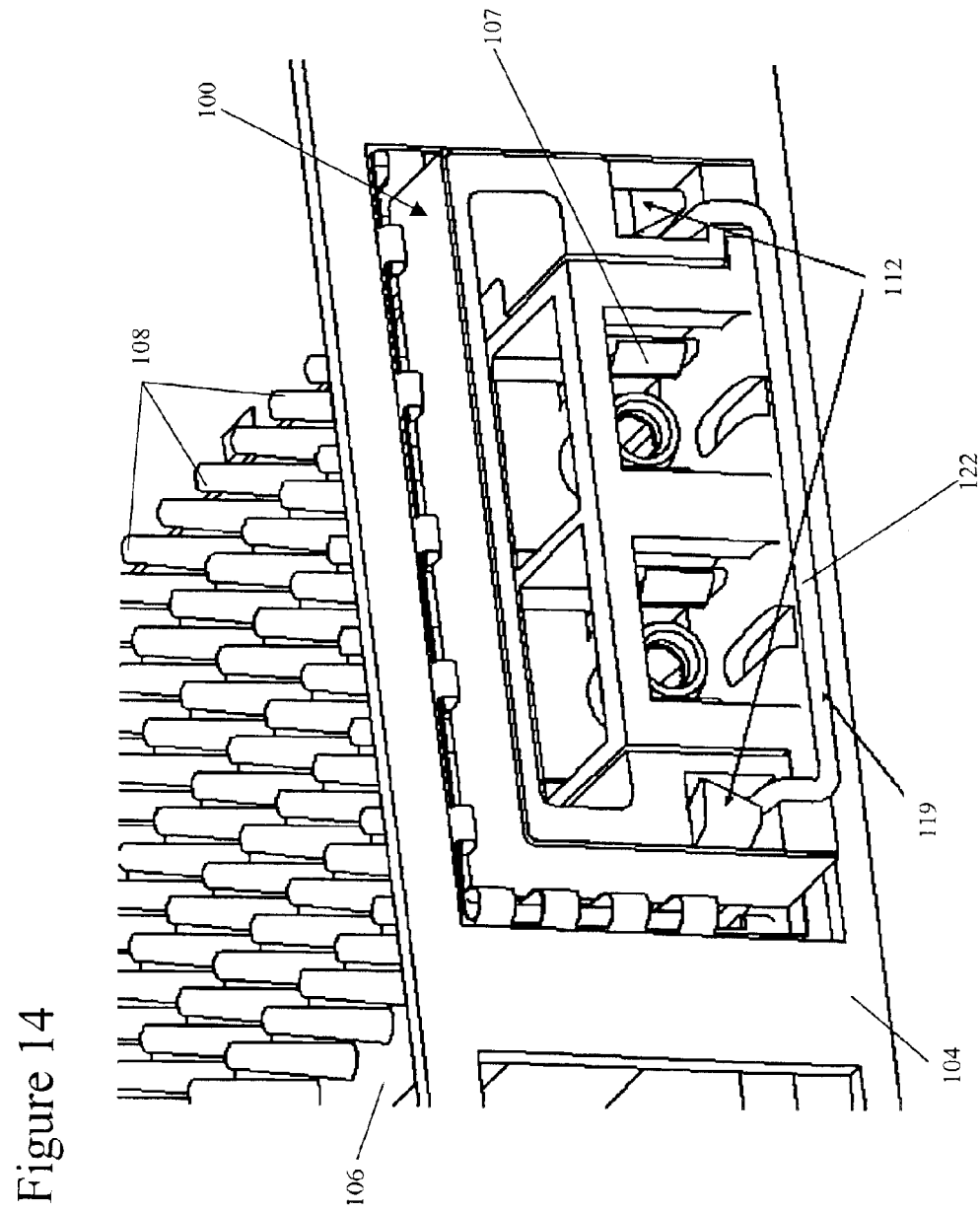
FIG. 14 is an isometric view of the front end of the transceiver module of FIGS. 11 and 12 with the bail in the locked-in position.

As best seen in FIG. 13, each latch mechanism 101 includes a rotating pin 110 supporting a pivoting arm 111, which comprises an actuating end 112 and a latching end 113. The latching end 113 includes a shoulder 114 for engaging a locking hole 116 formed in the guide rail 102, thereby preventing accidental disengagement of the transceiver module 100. A pair of kick back springs 117 normally bias the latching end 113 into the locking hole 116. Preferably, the kick back springs 117 are metallic leaf springs extending from a base 118 into contact with the latching end 113. A bail 119, including longitudinally extending side arms 121 and lateral handle 122, is pivotally connected to the housing 106 for releasing the latching end 113 from the locking hole 116. In use the bail 119 is lifted and the side arms 121 push against angled camming faces on the actuating ends 112, thereby producing a lateral force that pushes the actuating ends 112 outwardly, causing the latching ends 113 to pivot inwardly overcoming the force of the kick back springs 117. With the bail 116 in the lowered position, as in FIGS. 13 and 14, the kick back spring 117 is free to bias the latching ends 113 outwardly causing them to engage the locking holes 116 thereby fastening the transceiver module 100 to the guide rail assembly 102.

Figure 15:
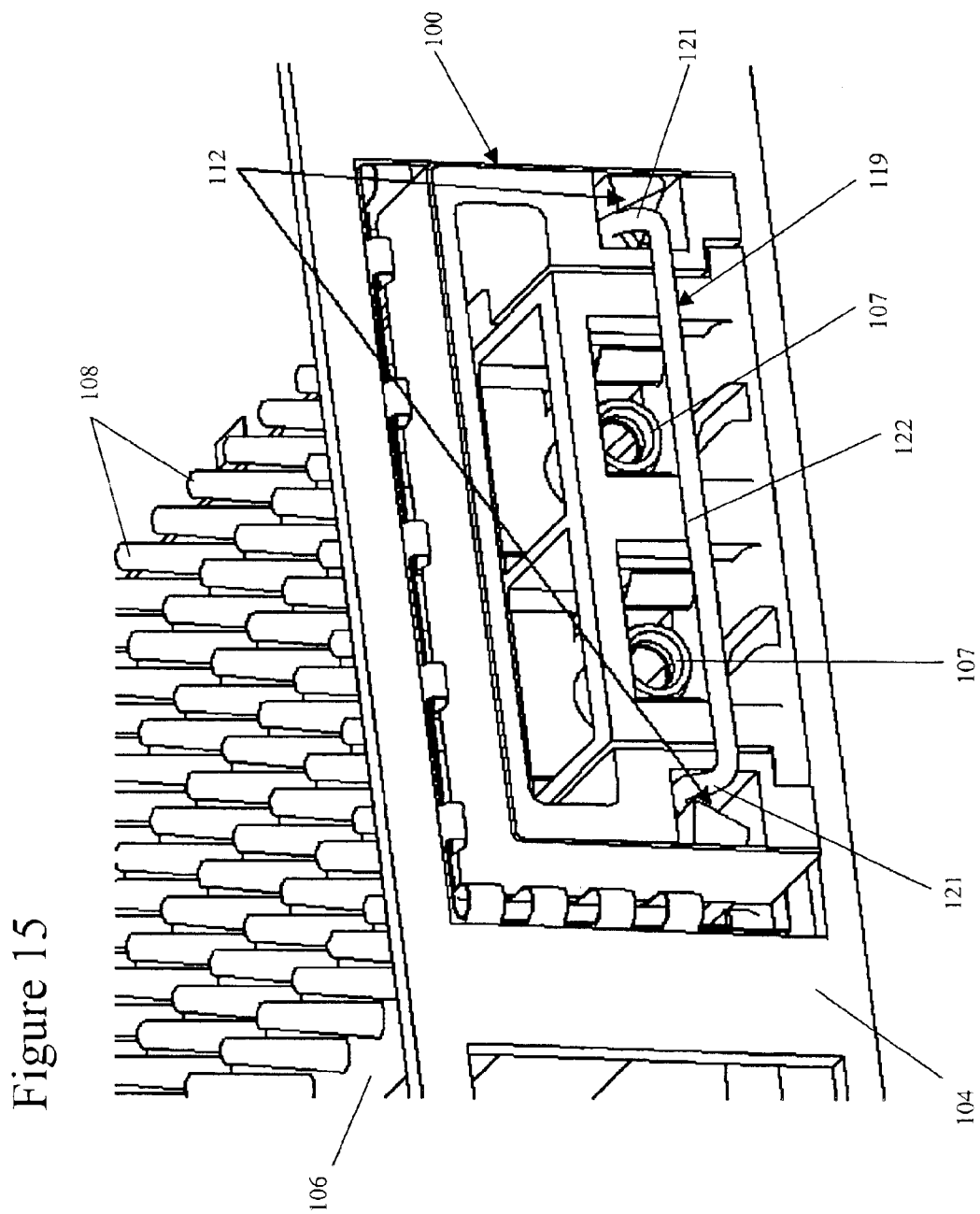
FIG. 15 is an isometric view of the front end of the transceiver module of FIGS. 11 and 12 with the bail in the removal position.

When no fiber connector is connected to the connector receptacles 107, the bail 116 can be lifted, as shown in FIG. 15, and the transceiver module 100 may be removed from the guide rail assembly 102. When a fiber connector is connected to the connector receptacles 107 the bail 119 is prevented from moving, thereby ensuring that the transceiver module 100 does not get accidentally removed while optically coupled to other devices.

We claim:

1. An opto-electronic device for transmitting signals between an optical waveguide and a host computer of the type including a mounting cage for receiving the opto-electronic device, the opto-electronic device, the opto-electronic device comprising:
    an optical sub-assembly for converting optical signals into electrical signals or electrical signals into optical signals;
    a housing for supporting the optical sub-assembly, the housing including a first latching member for engaging a corresponding second latching member on the mounting cage;
    an optical connector on a first end of said housing for receiving the optical waveguide, and for aligning the optical waveguide with the optical sub-assembly;
    a printed circuit board mounted in the housing including circuitry for controlling the optical subassembly;
    an electrical connector extending from a second end of said housing for transmitting electrical signals between the printed circuit board and the host computer; and
    a latching lever pivotally mounted on said housing having a grasping section extending from the first end of said housing for manually rotating the latching lever, and a force applying finger at an end opposite from the grasping section, the force applying finger including a camming surface for applying a force to the mounting cage to disengage the first and second latching members when the latching lever is rotated.

2. The device according to claim 1, wherein the first latching member comprises a latching projection extending from the housing; and
    wherein the second latching member comprises a recess in a resilient portion of the mounting cage;
    whereby the force applying finger bends the second latching member out of engagement with the first latching member.

3. The device according to claim 2, wherein the latching projection includes a camming surface for gradually deflecting the resilient portion of the mounting cage during insertion of the device into the cage.

4. The device according to claim 1, wherein the grasping section includes a bail.

5. The device according to claim 1, wherein the latching lever comprises:
    a bail extending from the first end of the housing including the grasping section;
    an arm extending into the housing from each end of the bail;
    a journal section on each arm pivotally mounted on the housing; and
    the force applying finger extending from an end of each arm.

6. The device according to claim 5, wherein the housing includes a base and an electrically conductive cover; and
    wherein the journal section is pivotally mounted between the base and the electrically conductive cover, whereby the latching lever is electrically grounded thereto.

7. The device according to claim 5, wherein each journal section comprises a bent section in each arm forming an axis of rotation for the latching lever.

8. The device according to claim 5, wherein the end of each arm forms a first stop with the housing to prevent the bail from pivoting outside end-face dimensions of the device at one extreme of throw travel; and wherein a second stop is provided between the bail and the housing to prevent the bail from pivoting outside end-face dimensions of the device at other extreme of throw travel.

9. The device according to claim 5, wherein each arm includes an offset section, whereby the bail does not interfere with the optical waveguide being connected to the optical connector when the device is fully received in the mounting cage.

10. The device according to claim 5, wherein the latching lever freely rotates until the first and second latching members are proximate one another, whereby the bail interferes with the optical waveguide being connected to the optical connector when the device is not fully received in the mounting cage.

11. The device according to claim 10, wherein the camming surface engaging a portion of the cage for rotating the latching lever to a down position, whereby the optical waveguide can be connected to the optical connector.

12. The device according to claim 5, wherein the bail includes an offset section, thereby providing easier access to another bail extending from another superposed device.

13. The device according to claim 5, further comprising a tab extending from the bail facilitating manual rotation of the latching lever.

14. The device according to claim 5, wherein the first latching member comprises a latching projection extending from the housing; and wherein the second latching member comprises a recess in a resilient portion of the mounting cage; whereby the fingers bends the second latching member out of engagement with the first latching member.

15. An opto-electronic device for transmitting signals between first and second optical waveguides and a host computer of the type including a mounting cage for receiving the opto-electronic device, the opto-electronic device comprising:

an receiver optical sub-assembly for converting optical signals from the first waveguide into electrical signals for transmission to the host computer, the receiver optical sub-assembly having first electric leads extending from a rear end thereof;

a transmitter optical sub-assembly for converting electrical signals from the host computer into optical signals for transmission on the second waveguide, the transmitter optical sub-assembly having second electric leads extending from a rear end thereof;

a printed circuit board electrically connected to the receiver and transmitter optical sub-assemblies via the first and second leads, respectively, the printed circuit board including circuitry for controlling the receiver and transmitter optical sub-assemblies;

un electrically and thermally conductive housing for supporting the receiver and transmitter optical subassemblies, the housing including:

a first latching member for engaging a corresponding second latching member on the mounting cage, and a T-shaped projection extending laterally between sides of the housing and longitudinally between the first and second leads for supporting the printed circuit board and for shielding the first leads from the second leads, thereby reducing crosstalk therebetween;

an optical connector extending from a first end of said housing for receiving the first and second optical waveguides, and for aligning the first and second optical waveguides with the receiver and transmitter optical sub-assemblies, respectively;

an electrical connector extending from a second end of said housing for mating with an electrical connector on a motherboard of the host computer to transmit electrical signals between the printed circuit board and the host computer; and a latching lever pivotally mounted on said housing having a grasping section extending from the first end of said housing for manually rotating the latching lever, and a force applying finger at an end opposite from the grasping section, the force applying finger including a camming surface for applying a force to the mounting cage to disengage the first and second latching members when the latching lever is rotated.

16. The device according to claim 15, further comprising a thermally conductive fastener for connecting the printed circuit board to the T-shaped projection, whereby the T-shaped projection and the conductive fastener dissipate heat from the printed circuit board.

17. The device according to claim 15, wherein the second end of the housing has a beveled edge to prevent the housing from short circuiting the electrical connector on the motherboard of the host computer.

18. The device according to claim 15, wherein the housing includes a housing base and at least one housing cover enclosing the housing base; wherein the housing base, the T-shaped projection and the first latching member are integrally cast.

* * * * *

UNITED STATES PATENT AND TRADEMARK OFFICE
CERTIFICATE OF CORRECTION

PATENT NO. : 6,890,206 B2
DATED : May 10, 2005
INVENTOR(S) : Distad et al.

It is certified that error appears in the above-identified patent and that said Letters Patent is hereby corrected as shown below:

Column 6,
Line 9, "electronic device, the opto-electronic device, the opto-" should read
-- electronic device, the opto --.

Signed and Sealed this

Thirty-first Day of January, 2006

JON W. DUDAS
*Director of the United States Patent and Trademark Office*